July 11, 1961  E. O. JANSSEN, JR  2,991,914

FERTILIZER SPREADING ATTACHMENT FOR LAWN MOWERS

Filed Nov. 25, 1958  2 Sheets-Sheet 1

INVENTOR
Ernest O. Janssen, Jr.

BY Cecil L. Wood

ATTORNEY

July 11, 1961  E. O. JANSSEN, JR  2,991,914
FERTILIZER SPREADING ATTACHMENT FOR LAWN MOWERS
Filed Nov. 25, 1958  2 Sheets-Sheet 2

INVENTOR
Ernest O. Janssen, Jr.

ATTORNEY

United States Patent Office 2,991,914
Patented July 11, 1961

2,991,914
FERTILIZER SPREADING ATTACHMENT FOR LAWN MOWERS
Ernest O. Janssen, Jr., 2307 Knight St., Dallas, Tex.
Filed Nov. 25, 1958, Ser. No. 776,233
1 Claim. (Cl. 222—171)

This invention relates to a fertilizer spreading attachment for lawn mowers, and it concerns more particularly an attachment for rotary blade type power driven lawn mowers for use in spreading powdered fertilizer.

A characteristic feature of rotary blade type power driven lawn mowers commonly used at the present time is that the motor thereof is used only to rotate the blade, which is positioned on the under side of the frame, in close proximity to the ground, and is rotatable about a vertical axis. Thus the mower may be pushed about at will, independently of the action of the motor.

Another feature of such mowers is that they include a wheeled platform, on which the motor is supported, having at least one supporting wheel which extends forwardly beyond the front of the platform. In one form thereof both of the front wheels extend forwardly beyond the front of the platform, while in another form one of the front wheels is positioned rearwardly of the other.

An object of this invention is to provide, in combination with a rotary blade type power driven lawn mower, a cylindrical container for powdered fertilizer having uniformly spaced openings in its peripheral wall, the container being arranged transversely of the mower and extending beyond the front thereof, the container being positioned above and forwardly of a front wheel of the mower, the peripheral surface of the container frictionally engaging the circumference of the wheel whereby the container is rotatable with the wheel in a direction opposite the direction of rotation of the wheel.

Another object of the invention is to provide, in combination with a rotary blade type power driven lawn mower, a cylindrical container for powdered fertilizer having uniformly spaced openings in its peripheral wall, the container being arranged transversely of the mower and extending beyond the front thereof, means rotatably supporting the container on the frame of the mower, the container being positioned above and forwardly of a front wheel of the mower, the peripheral surface of the container frictionally engaging the circumference of the wheel whereby the container is rotatable with the wheel in a direction opposite the direction of rotation of the wheel, and means biasing the container toward the wheel, in frictional engagement therewith.

Another object of the invention is to provide, in combination with a rotary blade type power driven lawn mower, a cylindrical container for powdered fertilizer having uniformly spaced openings in its peripheral wall, the container being arranged transversely of the mower and extending beyond the front thereof, means rotatably supporting the container on the frame of the mower comprising a pair of elongated members each pivotally connected at one end to one side of the frame and extending forwardly thereof, and a rod extending longitudinally through the container, centrally thereof, and rotatable therewith, the ends of the rod extending longitudinally outwardly beyond the ends of the container and being journaled in the forward ends of the elongated members, the container being positioned above and forwardly of a front wheel of the mower, the peripheral surface of the container frictionally engaging the circumference of the wheel whereby the container is rotatable with the wheel in a direction opposite the direction of rotation of the wheel, and means biasing the container toward the wheel, in frictional engagement therewith, consisting of a tension spring connected at one end to one side of the frame and at its opposite end to one of the elongated members intermediate its ends.

Another object of the invention is to provide, in the structure described, a pair of links each pivotally connected at one end to one of the elongated members, and a tension spring connected at its ends to the ends of the links opposite the elongated members whereby the elongated members are biased toward each other.

Another object of the invention is to provide, in the structure described, a pair of flanges extending radially outwardly from the container for abutting engagement with a front wheel of the mower to limit longitudinal movement of the container relative to the mower.

Another object of the invention is to provide a structure as described in which the container consists of an inner cylinder and an outer cylinder arranged telescopically relative to each other, the cylinders each having uniformly spaced openings in its peripheral wall which are registrable with corresponding openings of the other cylinder upon rotation of the cylinders relative to each other.

Another object of the invention is to provide a structure as described in which the container consists of an inner cylinder and an outer cylinder arranged telescopically relative to each other, the cylinders each having uniformly spaced openings in its peripheral wall which are registrable with corresponding openings of the other cylinder upon rotation of the cylinders relative to each other, the ends of the container being closed by discs connected to opposite ends of the respective cylinders and having radially outwardly extending flanges adapted to be grasped in the hands whereby the cylinders may be rotated relative to each other, the rod is passed through central openings therefor in the discs, and nuts are threaded on the ends of the rod whereby the cylinders may be secured in adjusted positions relative to each other.

Another object of the invention is to provide a structure as described in which the container consists of an inner cylinder and an outer cylinder arranged telescopically relative to each other, the cylinders each having uniformly spaced openings in its peripheral wall which are registrable with corresponding openings of the other cylinder upon rotation of the cylinders relative to each other, the ends of the container being closed by discs connected to opposite ends of the respective cylinders, an arcuate slot in one of the discs, a pin attached to the adjacent end of the opposite cylinder and extending longitudinally outwardly therefrom, through the slot, and a scale on the disc adjacent the slot indicating the rotative positions of the cylinders relative to each other as determined by the position of the pin relative to the slot.

The invention will be readily understood by referring to the following description and the accompanying drawing, in which.

Figure 1:
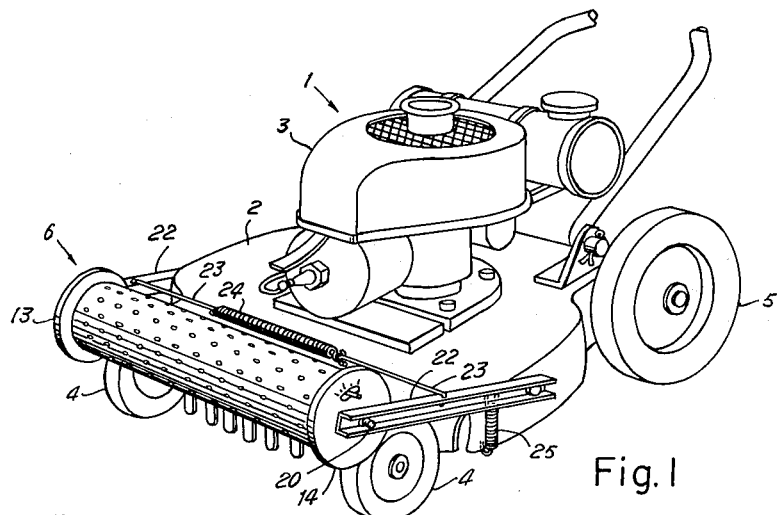
FIGURE 1 is a perspective view of a fertilizer spreading attachment embodying the invention as applied to a rotary blade type power driven lawn mower in which both of the front wheels extend forwardly beyond the front of the platform.
Figure 5:
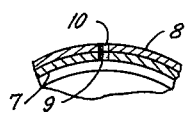
FIGURES 5 and 6 are fragmentary transverse sectional views of the container, on an enlarged scale, showing the cylinders in different rotative positions relative to each other.
Figure 6:
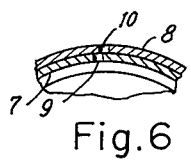
Figure 2:
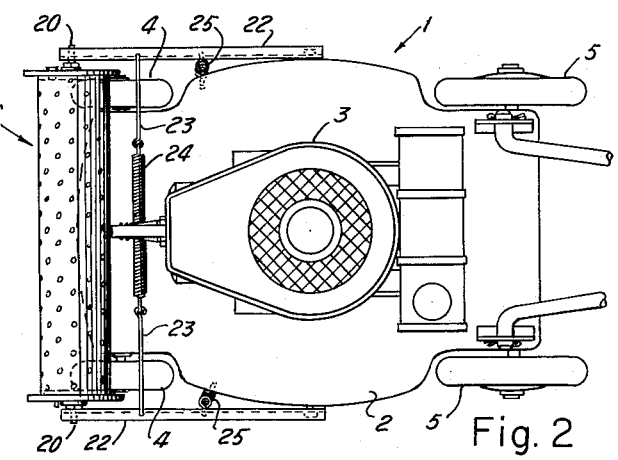
FIGURE 2 is a top plan view of the apparatus shown in FIGURE 1.
Figure 4:
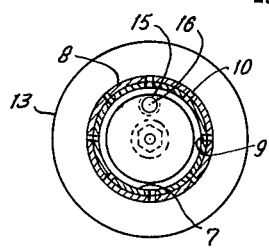
FIGURE 4 is a transverse sectional view taken on the lines 4—4 of FIGURE 3.
Figure 3:
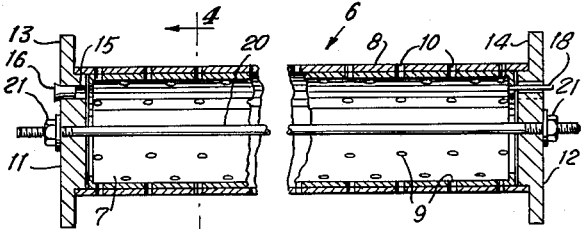
FIGURE 3 is a longitudinal sectional view of the container, taken on a median line, showing the openings of the cylinders in registration with each other.
Figure 4A:
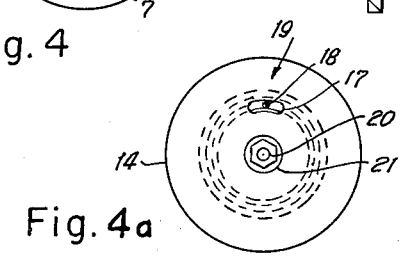
FIGURE 4a is a side elevational view of the container.

Referring to FIGURES 1 to 6 of the drawing, a rotary blade type power driven lawn mower is designated generally by the numeral 1. The mower 1 includes a wheeled platform 2, on which the motor 3 is supported, having a pair of front wheels 4 and a pair of rear wheels 5. Both of the front wheels 4 extend forwardly beyond the front of the platform 2.

A cylindrical container for powdered fertilizer is indicated generally by the numeral 6. The container 6 has uniformly spaced openings in its peripheral wall, as hereinafter described. The container 6 is arranged transversely of the mower 1 and extends beyond the front thereof. The container 6 is positioned above and forwardly of the front wheels 4 of the mower 1. The peripheral surface of the container 6 frictionally engages the circumference of the wheels 4 whereby the container 6 is rotatable with the wheels 4 in a direction opposite the direction of rotation of the wheels 4.

The container 6 consists of an inner cylinder 7 and an outer cylinder 8, which are arranged telescopically relative to each other. The cylinders 7 and 8 have uniformly spaced openings 9 and 10, respectively, in their peripheral walls. The openings 9 and 10 are registrable with each other upon rotation of the cylinders 7 and 8 relative to each other.

The ends of the container 6 are closed by discs 11 and 12, which are connected to opposite ends of the cylinders 7 and 8, respectively. The discs 11 and 12 have radially outwardly extending flanges 13 and 14, respectively, which are adapted to be grasped in the hands whereby the cylinders 7 and 8 may be rotated relative to each other.

The flanges 13 and 14 extend radially outwardly from the container 6 for abutting engagement with the front wheels 4 of the mower 1 to limit longitudinal movement of the container 6 relative to the mower 1.

An opening 15, which is normally closed by a plug 16, is provided in the disc 11 for use in filling the container 6.

An arcuate slot 17 is formed in the disc 12. A pin 18 is attached to the adjacent end of the cylinder 7 and extends longitudinally outwardly therefrom, through the slot 17. A scale 19 on the disc 12 adjacent the slot 17 indicates the rotative positions of the cylinders 7 and 8 relative to each other as determined by the position of the pin 18 relative to the slot 17.

A rod 20 extends longitudinally through the container 6, centrally thereof, and is rotatable therewith. The rod 20 is passed through central openings provided therefor in the discs 11 and 12, and nuts 21 are threaded on the ends of the rod 20 whereby the cylinders 7 and 8 may be secured in adjusted positions relative to each other.

A pair of elongated members 22 are each pivotally connected at one end to one side of the frame of the mower 1 and extend forwardly therefrom. The ends of the rod 20 extend longitudinally outwardly beyond the ends of the container 6 and are journaled in the forward ends of the elongated members 22. A pair of links 23 are each pivotally connected at one end to one of the elongated members 22 intermediate its ends, and a tension spring 24 is connected at its ends to the ends of the links 23 opposite the elongated members 22. The elongated members 22, with the rod 20, rotatably support the container 6 on the frame of the mower 1. The tension spring 24 biases the elongated members 22 toward each other.

A pair of tension springs 25 are each connected at one end to one side of the frame of the mower 1 and at its opposite ends to one of the elongated members 22 intermediate its ends, whereby the container 6 is biased toward the wheels 4, in frictional engagement therewith.

Figure 7:
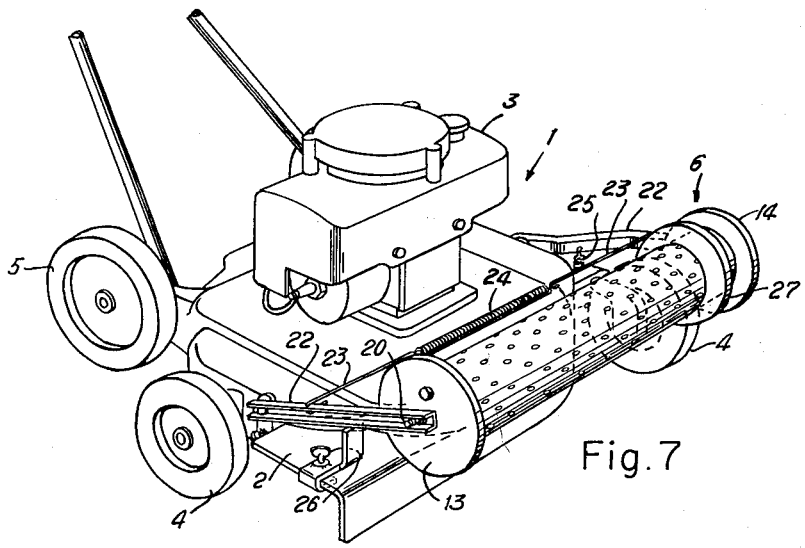
FIGURE 7 is a perspective view of a fertilizer spreading attachment embodying the invention as applied to a rotary blade type power driven lawn mower in which one of the front wheels is positioned rearwardly of the other.
Figure 8:
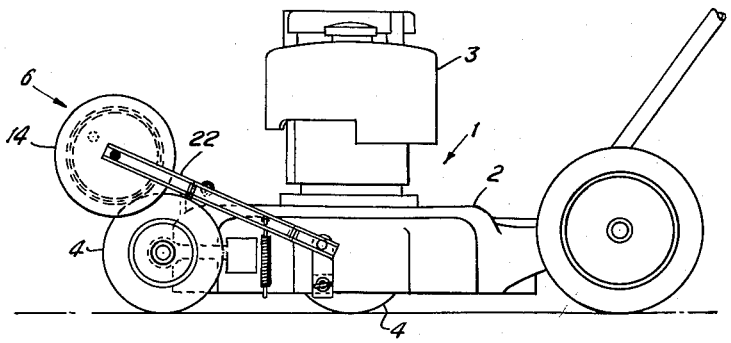
FIGURE 8 is a side elevational view of the apparatus shown in FIGURE 7.
Figure 9:
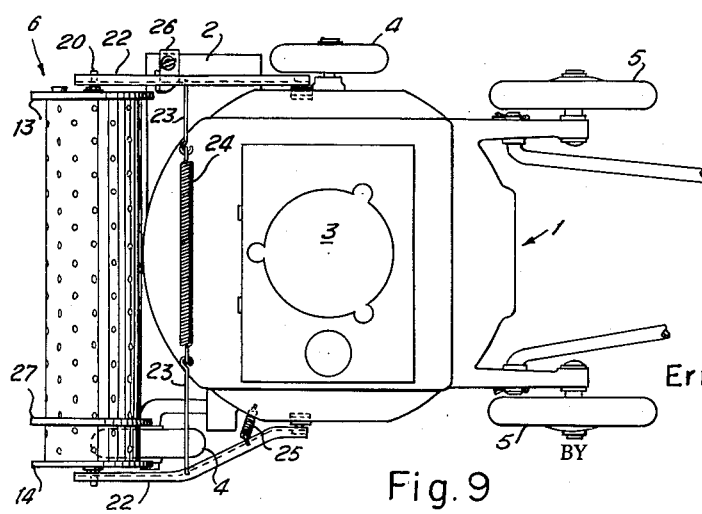
FIGURE 9 is a top plan view.

The arrangement shown in FIGURES 7 to 9 is generally similar to that shown in FIGURES 1 to 6. In FIGURES 7 to 9, however, one of the front wheels 4 is positioned rearwardly of the other. The peripheral surface of the container 6 frictionally engages the circumference of only the forward wheel 4. One of the elongated members 22 is supported on an upstanding bracket 26 which is attached to the platform 2 of the mower 1. An additional flange 27, similar to the flanges 13 and 14, is provided intermediate the ends of the container 6 for abutting engagement with the forward wheel 4.

The invention may be modified in various ways without departing from the spirit and scope thereof.

What is claimed is:

In a fertilizer distributor adapted for attachment to a lawn mower having wheels, a cylindrical container having an inner concentric sleeve rotatively adjustable therein, the said container and said sleeve each having perforations therein adapted to be aligned by rotating the said sleeve with respect to said container, a circular closure for each end of said container and said sleeve, each having a concentric boss formed thereon pressed into the opposing ends of said container adjacent the ends of said sleeve, and a radial flange formed with each closure extending beyond the exterior surface of said container, a rod extending concentrically through said closures and said sleeve connecting said closures and securing the same in the ends of said container, means connected to one end of said sleeve and projecting through one of said closures for rotating said sleeve with respect to said container whereby to adjust said perforations in said container and said sleeve to open and restrict the same, a pair of arms pivotally attached at one end to the ends of said rod adapted to have their opposite ends attached to the opposite sides of a lawn mower, and tensioned means connecting said arms whereby to support said container in engagement with the treads of the wheels of a lawn mower and whereby the said flanges overreach the outer sides of said wheels for restraining said container from endwise movement with respect to said wheels.

References Cited in the file of this patent

UNITED STATES PATENTS

| 2,728,492 | Fox | Dec. 7, 1955 |
| 2,792,970 | Gaiman | May 21, 1957 |
| 2,832,509 | Emanatian | Apr. 29, 1958 |